(12) United States Patent
Jensen

(10) Patent No.: US 10,878,260 B2
(45) Date of Patent: Dec. 29, 2020

(54) MICRO-FIDUCIAL FOR MACHINE VISION

(71) Applicant: Aurora Flight Sciences Corporation, Manassas, VA (US)

(72) Inventor: Devin Richard Jensen, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 127 days.

(21) Appl. No.: 16/162,646

(22) Filed: Oct. 17, 2018

(65) Prior Publication Data
US 2020/0125872 A1 Apr. 23, 2020

(51) Int. Cl.
*G06K 9/00* (2006.01)
*G06K 9/46* (2006.01)
*G06K 19/06* (2006.01)
*G06K 7/14* (2006.01)
*B64D 43/00* (2006.01)
*B25J 9/16* (2006.01)
*B64D 47/08* (2006.01)

(52) U.S. Cl.
CPC ........ *G06K 9/00832* (2013.01); *B25J 9/1697* (2013.01); *B64D 43/00* (2013.01); *B64D 47/08* (2013.01); *G06K 7/1413* (2013.01); *G06K 9/4604* (2013.01); *G06K 19/0614* (2013.01); *G06K 2209/01* (2013.01); *G06K 2209/21* (2013.01)

(58) Field of Classification Search
CPC ............. G06K 9/00832; G06K 7/1413; G06K 9/4604; G06K 19/0614; G06K 2209/01; G06K 2209/21; B64D 43/00; B64D 47/08; B25J 9/1697
See application file for complete search history.

(56) References Cited

U.S. PATENT DOCUMENTS

2018/0113505 A1\* 4/2018 Choi ..................... G06T 19/006
2019/0374291 A1\* 12/2019 Stolka ................... A61B 5/055

OTHER PUBLICATIONS

ARTag, AprilTag and CALTag Fiducial Marker Systems: Comparison in a Presence of Partial Marker Occlusion and Rotation (Year: 2017).\*
ChromaTag—A Colored Fiducial Marker (Year: 2017).\*
Olson, Edwin. "AprilTag: A robust and flexible visual fiducial system." Robotics and Automation (ICRA), 2011 IEEE International Conference on. IEEE, 2011. https://april.eecs.umich.edu/pdfs/olson2011tags.pdf.

(Continued)

*Primary Examiner* — Nizar N Sivji
(74) *Attorney, Agent, or Firm* — Michael Stanley Tomsa; McAndrews, Held & Malloy, Ltd.; Eugene H. Nahm

(57) ABSTRACT

A micro-fiducial marker arrangement representing a unique ID that is readable by a camera during an imaging operation. The micro-fiducial marker includes a base substrate, a perimeter line, an orientation bar, and a plurality of bit cells. The base substrate may be a first color, while the perimeter line, the orientation bar, and the plurality of bit cells may be a color that is different from the first color. The perimeter line may be positioned on the base substrate and arranged to run along a perimeter of the base substrate. Each of said plurality of bit cells may be either the first color or the second color to represent a binary-coded datum.

20 Claims, 11 Drawing Sheets

(56) References Cited

OTHER PUBLICATIONS

Lilian Calvet et al., "Detection and Accurate Localization of Circular Fiducials under Highly Challenging Conditions," 2016 IEEE Conference on Computer Vision and Pattern Recognition (CVPR), Jun. 27-30, 2016, Electronic ISSN 1063-6919, IEEE.
"Tern Moves Closer to Full-Scale Demonstration of Unmanned VTOL Aircraft Designed for Small Ships," Defense Advanced Research Projects Agency, News and Events, Dec. 28, 2015.
Barcode, Wikipedia definition.

\* cited by examiner

MICRO-FIDUCIAL FOR MACHINE VISION

STATEMENT OF GOVERNMENT INTEREST

This invention was made with government support under Contract Number: HR0011-15-C-0027 awarded by the Defense Advanced Research Projects Agency (DARPA). The government has certain rights in the invention.

TECHNICAL FIELD

The present disclosure relates to fiducial markers; more specifically, to fiducial markers used in machine vision systems.

BACKGROUND

Recent experience with automation in cockpits has shown that prior approaches of adding additional functionality to flight decks increases complexity, causes overreliance on automation, and may not necessarily reduce workload, especially during critical situations. To interpret instruments in the cockpit, the cockpit automation systems may use one or more optical systems to read and interpret the instruments in a cockpit, such as dials, displays, etc. A complication in vision system is accurately locating and interpreting desired instruments.

Using fiducial markers can ensure reliable detection and identification of planar features in images. The term fiducial marker, or simply fiducial, refers to a set of (coplanar) points encoded in a planar pattern allowing a reliable detection and identification across views. A fiducial marker system (e.g., one or more fiducial markers in a view) coupled with dedicated computer vision algorithms can be used to solve the detection and identification problems. Fiducials are used in a wide range of applications, especially when a reliable visual reference is needed, e.g., to track the camera in cluttered or textureless environments. A marker designed for such applications must be robust to partial occlusions, varying distances and angles of view, and fast camera motions The size of a fiducial marker may be a function of the amount of data stored to the fiducial marker. For example, fiducial markers designed to store larger amounts of information are generally larger than those capable of only storing limited information. The amount of space in a cockpit is generally limited. Therefore, it is desirable to use robust, smaller fiducial markers that can be readily captured by the optical system and over a larger variety of messages.

SUMMARY OF THE INVENTION

The present disclosure is directed to fiducial markers; more specifically, to fiducial markers used in machine vision systems.

According to a first aspect, a micro-fiducial marker comprises: a base substrate of a first color; a perimeter line of a second color, wherein the perimeter line is positioned on the base substrate and arranged to run along a perimeter of the base substrate; an orientation bar of the second color; and a plurality of bit cells, each of said plurality of bit cells being either the first color or the second color to represent a binary-coded datum, wherein the plurality of bit cells is arranged to form a two-dimensional grid arrangement representing a unique ID that is readable by a camera during an imaging operation.

In certain aspects, the first color is a highly contrasting color relative to the second color.

In certain aspects, the first color is black and the second color is white.

In certain aspects, the micro-fiducial marker employs a monochromatic framework.

In certain aspects, the micro-fiducial marker employs a multichromatic framework.

In certain aspects, each of the plurality of bit cells is a quadrilateral.

In certain aspects, each of the plurality of bit cells is a rectangle.

In certain aspects, the orientation bar is a rectangle having an aspect ratio of at least 3:1.

In certain aspects, the perimeter line defines an image region having a first and a second non-overlapping sub-region.

In certain aspects, the first non-overlapping sub-region comprises the orientation bar.

In certain aspects, the second non-overlapping sub-region comprises the plurality of bit cells.

In certain aspects, the second non-overlapping sub-region is a data region.

In certain aspects, the plurality of bit cells consists of six bit cells.

In certain aspects, the six bit cells are arranged in a 2×3 grid arrangement.

In certain aspects, the grid arrangement includes at least one bit row.

In certain aspects, the at least one bit row is parallel to a longitudinal axis of the orientation bar.

In certain aspects, the base substrate is a quadrilateral base substrate.

In certain aspects, the quadrilateral base substrate is a square.

According to a second aspect, a method for locating a physical target object within a physical location using a plurality of physical micro-fiducial markers and a digital scene captured by a camera comprises the steps of: determining a spatial relation between the physical target object relative to a plurality of physical micro-fiducial markers positioned on an external surface of an object, wherein each of the physical micro-fiducial markers comprises a base substrate of a first color; a perimeter line of a second color that is positioned on the base substrate and arranged to run along a perimeter of the base substrate, an orientation bar of the second color, and a plurality of bit cells, each of said plurality of bit cells being either the first color or the second color and configured to represent a binary-coded datum, and wherein the plurality of bit cells is arranged to form a two-dimensional grid arrangement representing a unique ID that is readable by a camera during an imaging operation; obtaining the digital scene of the object including a digital representation of each of the plurality of said physical micro-fiducial markers; and performing an edge-detection algorithm on the digital scene to generate a binary image of the digital scene.

In certain aspects, the method further comprises the step of determining flight information using the physical target object, wherein the physical target object is a flight instrument.

In certain aspects, the flight information is determined by performing one or more optical character recognition (OCR) processes on the binary image or a portion thereof.

In certain aspects, the method further comprises the step of determining a spatial relation of an actuable instrument relative to the plurality of physical micro-fiducial markers.

In certain aspects, the method further comprises the step of actuating the actuable instrument as a function of the flight information determined using the physical target object.

In certain aspects, the step of actuating the actuable instrument is performed using a robotic arm.

In certain aspects, the method further comprises the step of determining a location of the camera relative to the location of the physical target object as a function of the digital representation of each of the plurality of said physical micro-fiducial markers in the digital scene.

DESCRIPTION OF THE DRAWINGS

These and other advantages of the present disclosure may be readily understood with the reference to the following specifications and attached drawings wherein:

FIG. 5b illustrates an example reformatted image (binary image) of the image of FIG. 5a.

DETAILED DESCRIPTION

Figure 1A:
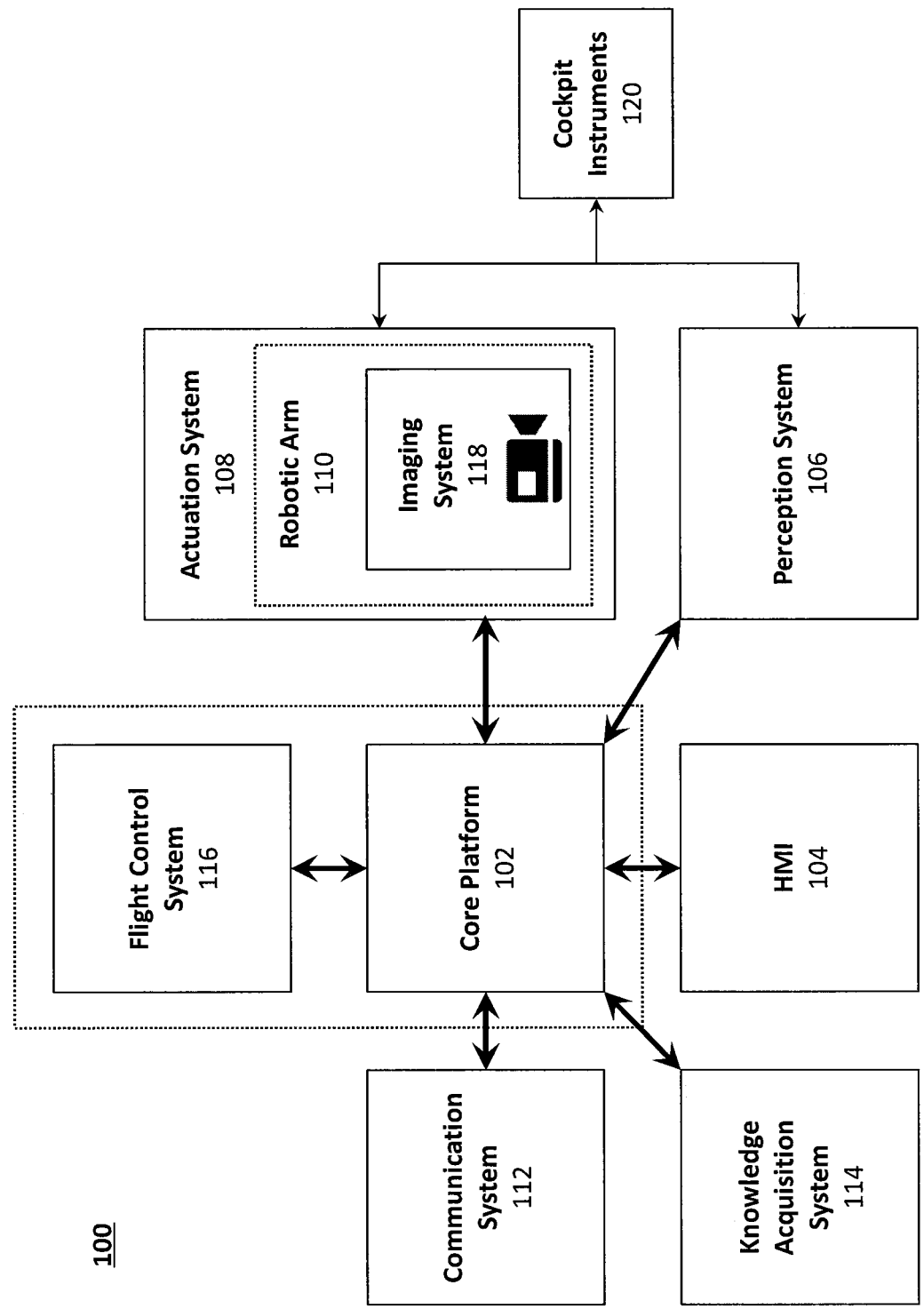
FIG. 1a illustrates a block diagram of an example aircrew automation system.

Preferred embodiments of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

The terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The term "and/or" means any one or more of the items in the list joined by "and/or". As an example, "x and/or y" means any element of the three-element set {(x), (y), (x, y)}. In other words, "x and/or y" means "one or both of x and y".

As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

The terms "about" and "approximately," when used to modify or describe a value (or range of values), mean reasonably close to that value or range of values. Thus, the embodiments described herein are not limited to only the recited values and ranges of values, but rather should include reasonably workable deviations. As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

The terms "aerial vehicle" and "aircraft" refer to a machine capable of flight, including, but not limited to, both traditional runway and vertical takeoff and landing ("VTOL") aircraft. VTOL aircraft may include fixed-wing aircraft (e.g., Harrier jets), rotorcraft (e.g., helicopters), and/or tilt-rotor/tilt-wing aircraft.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

Disclosed herein is a system configured to, inter alia, function as a pilot's assistant (or co-pilot). Such an aircrew automation system may be configured to operate an aircraft from takeoff to landing, automatically executing the necessary flight and flight plan activities, checklists, and procedures at the correct phases of flight, while detecting contingencies and responding to them. An aircrew automation system in accordance with an aspect of the present disclosure may employ an imaging capture system to capture images of the cockpit (e.g., its various instruments) and to provide information to a controller for processing. The imaging capture system may be fixed or coupled to a moving structure, such as a robotic arm. To assist in data capture, the aircrew automation system may use compact, robust fiducial markers in connection with its machine vision system. The aircrew automation system's imaging capture system provides a pilot with high-fidelity knowledge of the aircraft's physical state, and notifies that pilot of any deviations in expected state based on, for example, predictive models. This state awareness may be translated directly into useful information for the pilot, such as alerts to developing emergency conditions, fuel state computation, notification of icing conditions, etc.

Figure 1B:
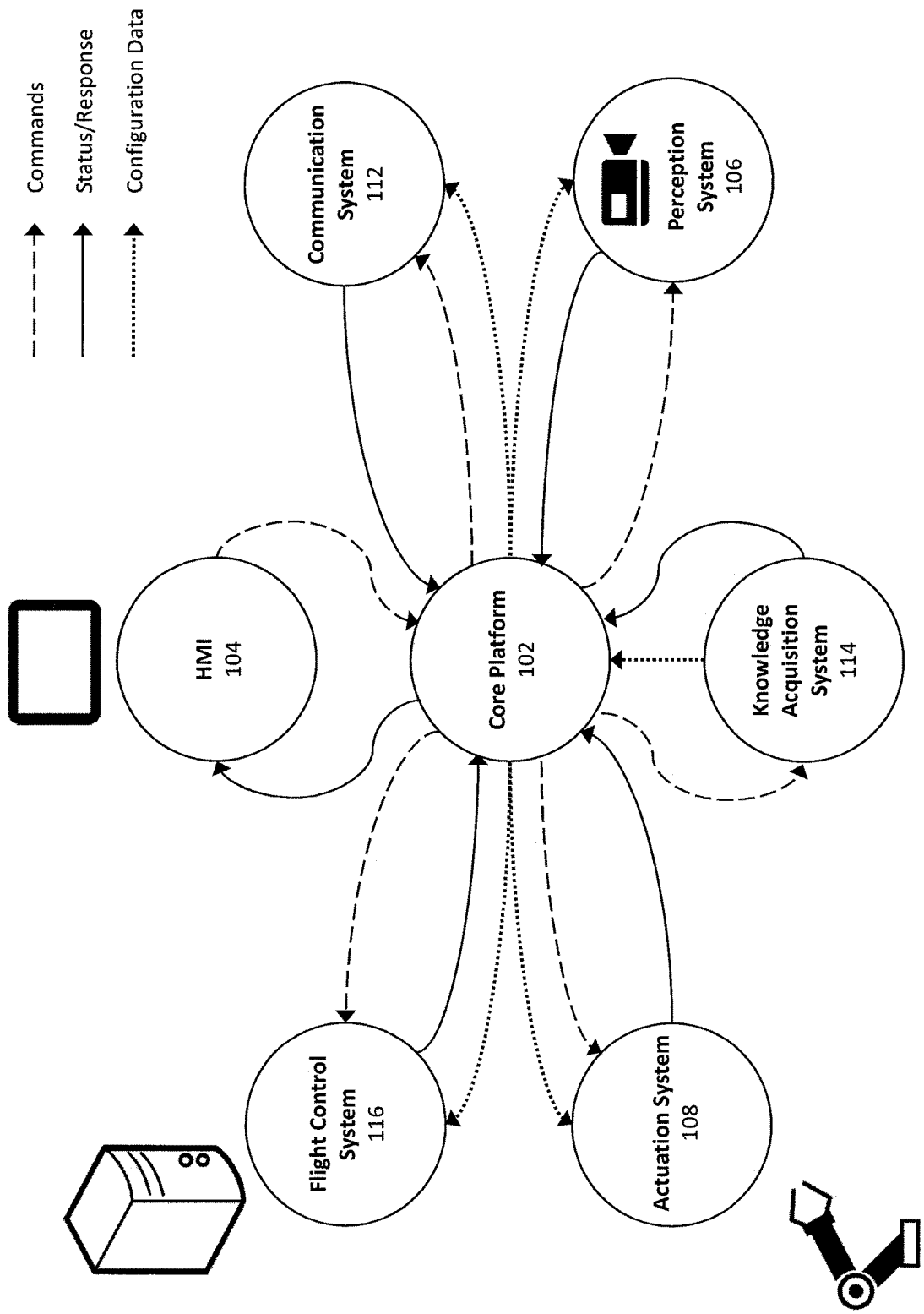
FIG. 1b illustrates an example flow of information data between the subsystems of the aircrew automation system.

FIGS. 1a and 1b illustrate an example system architecture for an aircrew automation system 100 in accordance with one aspect. The aircrew automation system 100 may comprise a core platform 102 operatively coupled with a plurality of subsystems. Example aircrew automation systems 100 are described in greater detail by commonly owned U.S.

Patent Publication No. 2017/0277185 to Jessica E. Duda et al., filed Mar. 21, 2017, and commonly owned U.S. patent application Ser. No. 15/661,149 to William Bosworth et al., filed Jul. 27, 2017.

With reference to FIG. 1a, the core platform 102 may operate as a central subsystem that connects the other subsystems via one or more interfaces. The subsystems may communicate with one another through software and/or hardware interfaces using wired and/or wireless communication protocols and hardware. FIG. 1b illustrates an example flow of information (e.g., data) between the various subsystems. Each of the plurality of subsystems of the aircrew automation system 100 may be either integral or modular, thereby allowing the entire aircrew automation system 100 to be substantially ported to another aircraft rapidly. The plurality of subsystems may include, for example, a human machine interface ("HMI") system 104, a perception system 106, an actuation system 108, a communication system 112, a knowledge acquisition system 114, and a flight control system 116, each of which may be operatively coupled with the core platform 102. The actuation system 108 may include, for example, a robotic arm 110 having an imaging system 118. Depending on the configuration, the aircrew automation system 100 may be configured with fewer or additional modules, components, or systems without departing from the spirit and scope of the disclosure.

To enable a vehicle-agnostic aircrew automation system 100, a processor-based core platform 102 may provide, or otherwise serve as, middleware that can be made specific to a particular aircraft or configuration through an initial transition and setup phase. The core platform 102 may serve as the primary autonomous agent and decision-maker, which synthesizes inputs from the perception system 106 and HMI system 104 with its acquired knowledge base to determine the overall system state. The core platform 102 may process inputs from the various sensor suites and aggregate the resultant information into an understanding of current aircraft state.

The knowledge acquisition system 114 gathers and/or generates a knowledge base necessary to enable the aircrew automation system 100 to determine aircraft specific information. This includes knowledge of aircraft performance characteristics, limitations, checklists, and procedures (including emergency procedures), and criteria that define contingencies in the aircraft. The data may be derived from a combination of encoded data (e.g., from manuals, pilot briefings, pilot operating handbook) and data acquired in flight (e.g., via sensors), which supports off-line machine-learning and trend analysis. As illustrated in FIG. 1b, for example, the knowledge acquisition system 114 may receive operational commands from the core platform 102, while sending to the core platform 102 configuration data and status and response information generated by the knowledge acquisition system 114.

The flight control system 116 derives the aircraft state based on information data from another subsystem (e.g., perception system 106 or imaging system 118) and directs another subsystem (e.g., the actuation system 108) to operate (e.g., dynamically) in a manner to maintain aircraft stability. For example, the flight control system 116 may receive vehicle mode commands and configuration data from the core platform 102, while sending to the core platform 102 status and command information generated by the flight control system 116. For example, the core platform 102 may be configured to communicate one of more commands to the flight control system 116 of the aircraft based at least in part on the flight situation data, which may be obtained from the perception system 106.

Figure 2:
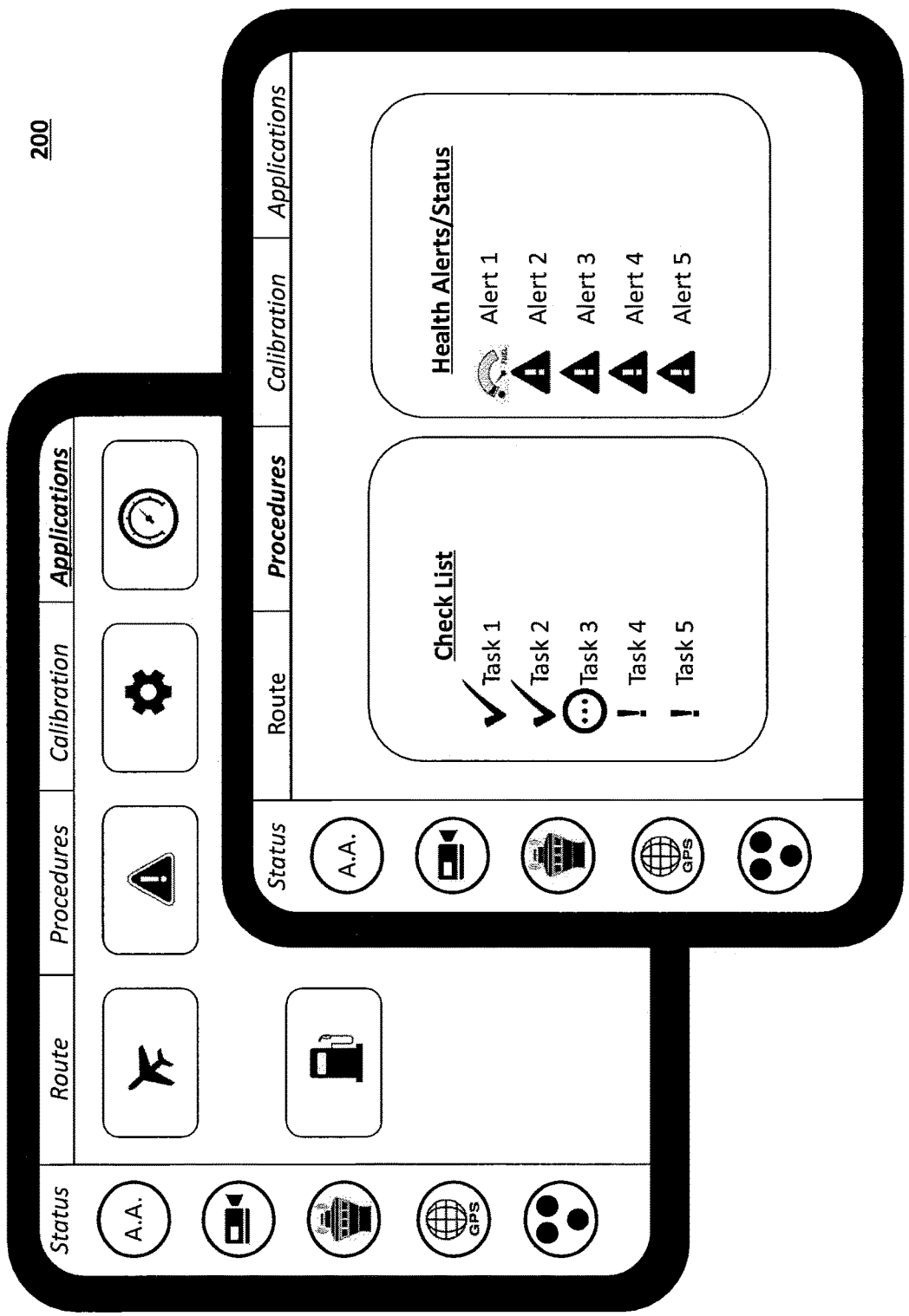
FIG. 2 illustrates an example human-machine interface illustrating a procedural checklist and aircraft health alert screen.

The HMI system 104 provides a control and communication interface for the pilot (e.g., a human pilot, whether on-board or remote). The HMI system 104 may include a human-machine interface 200, which may be based on a touch screen graphical user interface ("GUI") and/or speech-recognition systems. FIG. 2 illustrates an example human-machine interface 200 having a single-screen touch interface and speech-recognition system. The HMI system 104 serves as a primary channel of communication between the pilot and the aircrew automation system 100. For example, as illustrated in FIG. 1b, for example, the HMI system 104 may receive status information from a subsystem via the core platform 102, while sending to the core platform 102 mode commands generated by the HMI system 104 or input by the pilot. The human-machine interface 200 may employ a tablet based GUI and/or a speech-recognition interface to enable vocal communications. As illustrated, the HMI system 104 may provide an intuitive display and interface that includes checklist verification and health alerts from the core platform 102 and predictions of aircraft state (e.g., fuel consumption and predicted remaining range), as well as failure prognosis and deviation alerts (e.g., "Left engine EGT is 5 degrees above normal and rising").

The perception system 106 collects, determines, or otherwise perceives the real-time aircraft state. The perception system 106, for example, may employ a combination of a vision system, an acoustic system, and identification algorithms to read or comprehend flight situation information displayed by instruments 120. Example instruments 120 in a cockpit include, for example, an altimeter, an airspeed indicator, a vertical speed indicator, one or more compass systems (e.g., a magnetic compass), one or more gyroscopic systems (e.g., attitude indicator, heading indicator, turn indicator), one or more flight director systems, one or more navigational systems (e.g., very-high frequency omnidirectional range (VOR), non-directional radio beacon (NDB)), etc.

Figure 3:
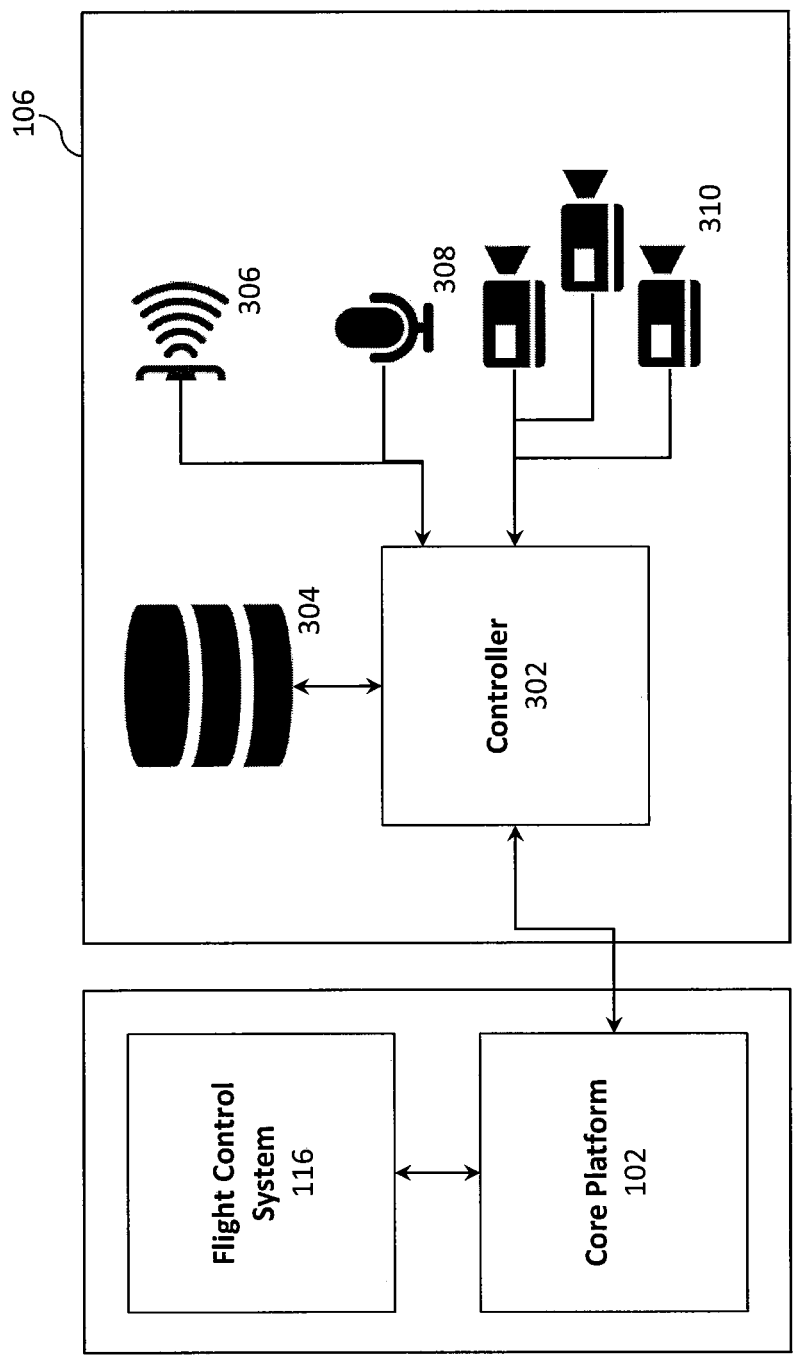
FIG. 3 illustrates a block diagram of an example perception system.

FIG. 3 illustrates an example perception system 106 operatively coupled with, inter alia, the core platform 102 (which is coupled to other subsystems, such as a flight control system 116). The perception system 106 visually and/or acoustically monitors, inter alia, the instruments 120 to generate flight situation data that can be used to derive the aircraft state from cockpit layouts, which may range from basic analog instruments to highly integrated, glass cockpit avionics suites. In addition to deriving physical state, such as airspeed and altitude, the perception system 106 may also monitor instruments 120 that are specific to aircraft systems such as fuel gauges and radios and provide secondary feedback about the status and positioning of the actuation system 108. As illustrated, the perception system 106 may comprise a perception controller 302 that is operatively coupled with a database 304 and a plurality of sensors, such as cameras 310 (used for the vision system), microphone 308 (used for the acoustic system), and/or other sensors 306 (e.g., temperature sensors, positional sensors, inertial sensors, etc.). The perception controller 302 may be, for example, a processor configured to feed flight situation data to (or otherwise instruct) the core platform 102 based upon information received and manipulated information received from the plurality of sensors, the database 304, and external components, such as the GPS/INS system and other input systems. As illustrated in FIG. 1b, for example, the perception system 106 may receive commands and configuration data from the core platform 102, while sending to the core platform 102 status and flight situation information (e.g., flight situation data) and/or images gathered by the perception system 106.

The one or more cameras 310 (e.g., lightweight machine vision cameras) may be trained on the instrument panel to maximize pixel density, glare robustness, and redundancy. The one or more cameras 310 may connect to the perception controller 302 via, for example, a wireless connection or a wired connection, such as Ethernet. The one or more cameras 310 may be installed with a line of sight including the instrument panel, but so as to be not obstructive to the pilot. The perception system 106 may employ a monocular or stereovision system, possibly including fiducial markers, to continuously monitor the state of the aircraft by reading what is displayed on the instruments 120. In certain aspects, by comparing information about a scene from two vantage points, 3D information can be extracted by examining the relative positions of objects in the two panels.

The vision system may be used to accurately monitor instruments 120 (e.g., glass gauges, physical steam gauges, etc.) and switches, as well as their positions in a variety of lighting conditions and cockpit layouts and sizes. Using a stereovision system and/or fiducial markers also provides sensing to prevent collisions between any robotic components and the pilot. The vision system may employ a suite of high-definition stereo cameras and/or a LIDAR laser scanner. The vision system may be capable of recognizing data from all instruments 120 and derive the state of switches, knobs and gauges that display the state of an aircraft (e.g., remaining fuel). It may also be capable of recognizing the state of the panel with enough resolution to detect minor changes that result from pilot actions. Machine vision algorithms on the perception system 106 computer identifies' the instruments 120 (gauges, lights, wind correction angle panel, individual elements of the primary flight display or multi-function display in a glass cockpit) and mechanical items such as throttle levers, trim settings, switches, and breakers to provide a real-time cockpit state/status update to the core platform 102. The vision system may be fixed in a particular location, or coupled to a movable object, as will be described with regard to the imaging system 118 of the robotic arm 110.

Figure 4:
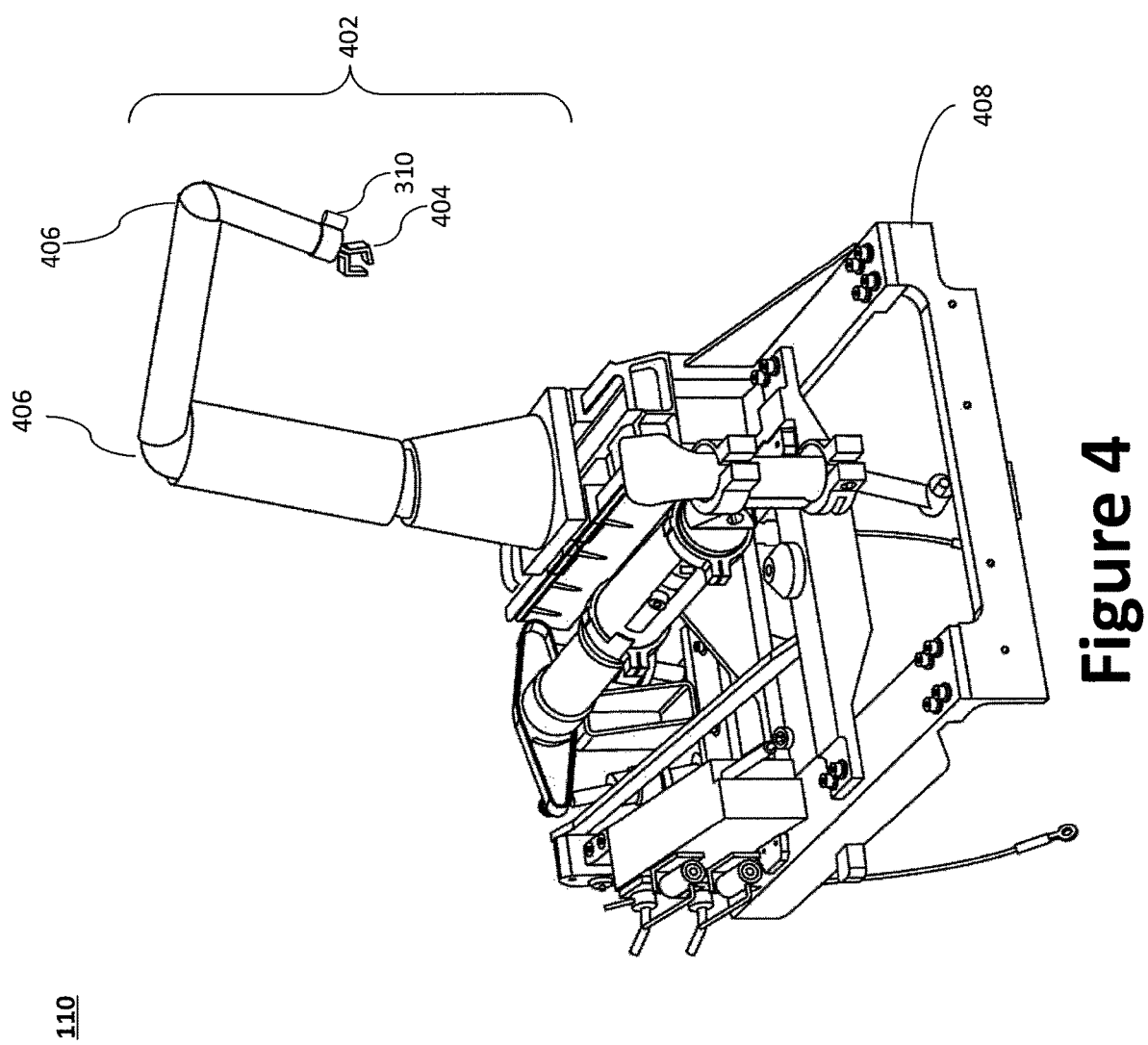
FIG. 4 illustrates an example actuation system.

The aircrew automation system's 100 actuation system 108 executes the actions commanded by the core platform 102 to guide the flight and overall operation of the aircraft without interfering with the activities performed by the pilot. As illustrated in FIG. 1b, for example, the actuation system 108 may receive actuation commands and configuration data from the core platform 102, while sending to the core platform 102 status and response information generated by the actuation system 108. As shown in FIG. 4, a robotic arm 110 may include a frame 408 having an articulating arm 402 (e.g., a robotic appendage or "arm"). The actuator-controlled articulating arm 402 may be sized, shaped, and configured to occupy the space typically occupied by a co-pilot's arms, thereby ensuring adequate access to the instruments 120 and/or portability across aircraft.

To enable movement in multiple degrees of freedom ("DOF") movement, the articulating arm 402 may comprise a plurality of arm segments (whether linear, curved, or angled) joined using a plurality of hinged or pivotal joints 406. The articulating arm 402 may comprise an end-effector 404 at its distal end. The end-effector 404 may be coupled to the articulating arm 402 via a multiple-DOF connection. The base of the articulating arm 402 may be rotatable and slideably coupled to the frame 408 via a movable base. The articulating arm 402 can be equipped with an encoder (e.g., twin 18-bit encoders) for each of its degrees of freedom to ensure exact positioning of the articulating arm 402. Internal clutches may be provided at each hinged or pivotal joint 406 such that the articulating arm 402 can be overpowered by the pilot if so desired, without damaging the articulating arm 402. In such a case, the aircrew automation system 100 may determine the position or location of the articulating arm 402 using the encoders.

The end-effector 404 may be, for example, a gripper configured to couple, or otherwise engage, for example, throttle levers, etc. The end-effector 404 may also provide force and pressure detection so as to allow the aircrew automation system 100 to estimate how a flight controls actuator is grasped and to adjust the motion to properly read or engage the instruments 120. Once the motion is executed, the same feedback may be used to determine if the desired switch configuration has been achieved. In certain aspects, the articulating arm 402 may be fitted with an electronic device (e.g., a homing device, camera, pressure sensors, etc.) that enables it to find and hit a target. In certain aspects, the robotic arm 110 may be provided with imaging capabilities integrated therewith, which may be configured to operate with the unique fiducial system. The unique fiducial system may be used to alone or in connection with the electronic device to ensure accurate tracking of instruments and/or the robotic arm 110. In particular, the robotic arm 110 may be optimized for collecting and analyzing image data in order to actuate one or more processes in an automated aircraft environment. In one example, the robotic arm 110 contains a camera (e.g., imaging system 118) at its end-effector 404 used for imaging a scene of the aircraft, such as instruments 120 and corresponding displays. The robotic arm 110 may also include a force-sensing finger to both enable closed-loop control of a desired contact force, as well as collect contact force data during operation of the robotic arm 110 and/or the force-sensing finger.

Therefore, the robotic arm 110 may be configured with an imaging system 118 (e.g., the vision system described in connection with the perception system 106), and one or more controllers to implement a variety of complex operations in the cockpit. For example, the imaging system 118 can provide information to a controller (e.g., core platform 102) to manipulate/actuate an instrument (e.g., an actuable instrument, such as a switch, a dial, a knob, etc.), ensure that the instrument is correctly identified, as well as make determinations as to the state of the instrument before, during, and after the operation. For instance, a switch can be located in a particular area of the cockpit, the distance and location being identified based on the input from the imaging system 118. Upon receiving a command to operate the switch, the controller can determine the optimal way to maneuver the end-effector 404 to the switch (e.g., trajectory of the robotic arm, distance from current position to the switch). The controller can further determine one or more parameters of the interaction (e.g., an expected change in state of the switch, an amount of force required to activate the switch, etc.) and monitor information from the sensors corresponding to those parameters.

The camera mounted to the robotic arm 110 allows for the imaging system 118 to obtain a variety of views from multiple perspectives within the cockpit. At one end of the robotic arm 110, a robotic appendage, such as the end-effector 404, can integrate imaging and/or force sensors. Therefore, in a cockpit environment, cockpit instruments can be oriented vertically, horizontally, or at various angles, to conform to the reach and position of a human operator. The camera mounted to the robotic arm 110 can view surfaces and cockpit instruments at various locations and angles within the cockpit. In this manner, the robotic arm 110 can be moved about the cockpit to view cockpit instruments that may be blocked from a static view, as well as avoiding obscuring the view of the pilot during flight. Thus, the flexibility of the robotic arm 110 described herein is a departure from statically-mounted cameras found in other systems, with multiple advantages as described herein. While illustrated as separate components, in certain aspects, the imaging system 118 and the perception system 106 may share components, such as the perception controller 302 and cameras 310.

Figure 5A:
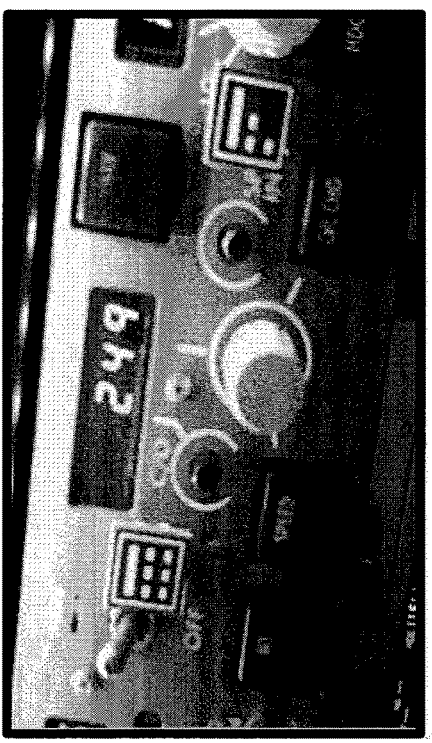
FIG. 5a illustrates an example raw image captured by an imaging system.
Figure 5B:
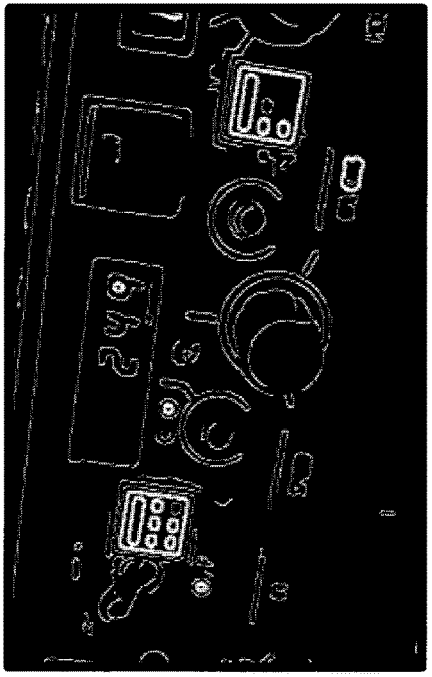

Information from the imaging system 118 (and, where applicable, a force sensor) mounted to the robotic arm 110 can be employed to build and/or verify two- and three-dimensional models of the cockpit and associated instruments. Integrating image sensors greatly enhances flexibility to observe and interact with the instruments/human interfaces in the cockpit, (e.g., displays, buttons, switches, knobs, screen interfaces of the FMS, etc.) and understanding different states of the cockpit instruments (e.g., an autopilot system). In examples, the camera sends image data representing an image of a field of view to a controller to analyze and/or manipulate the images to create a standardized view. The standardized view can be in a format that is easily readable by one or more systems. The image data may be raw image data or pre-processed image data For example, a raw image of a device and/or cockpit instruments obtained via the camera 310 (e.g., as shown in FIGS. 5*a* and 5*d*) can be reformatted to binary images (e.g., as shown in FIGS. 5*b* and 5*e*) such that elements of the image are recognizable as a panel containing one or more physical and/or virtual instruments. Each of the one or more instruments can correspond to one or more displays, such as a numerical readout.

Figure 5C:
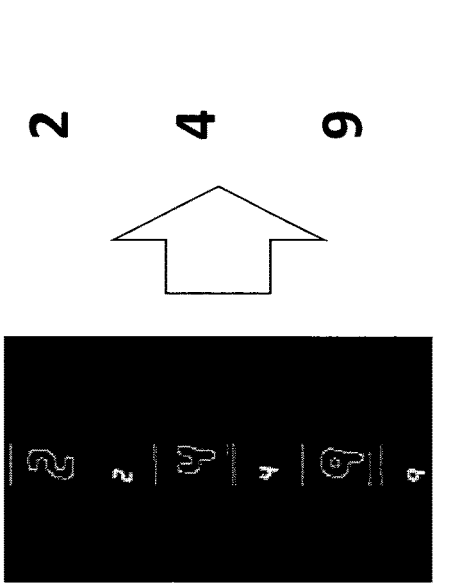
FIG. 5c illustrates an example of data extracted from the reformatted image of FIG. 5b.
Figure 5E:
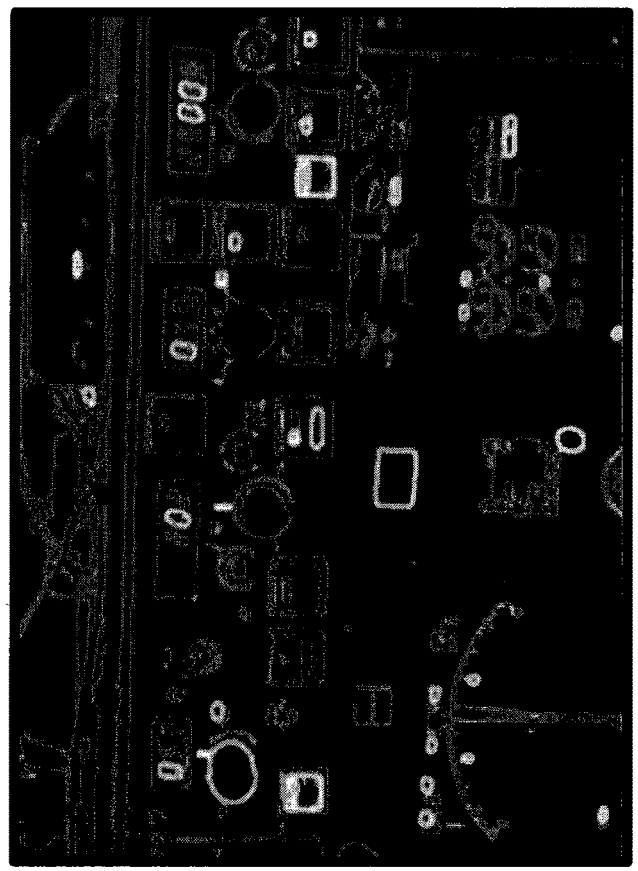
FIG. 5e illustrates an example reformatted image of the image of FIG. 5d.
Figure 5D:
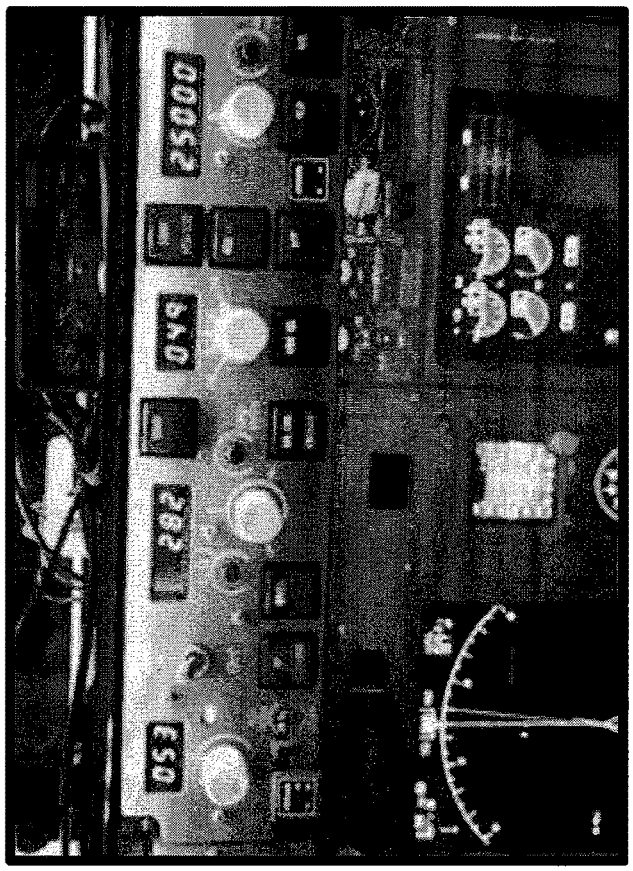
FIG. 5d illustrates another example raw image captured by an imaging system.

In the example illustrated in FIGS. 5*a* through 5*c*, the camera captures an image of instruments 120 (FIG. 5*a*), and an edge-detection algorithm is performed on the image to generate the binary image (FIG. 5*b*). This type of image processing techniques can be incremented throughout the identification and/or analysis routine. As shown in FIG. 5*c*, the system is configured to recognize information presented via the instruments, which is then transformed via the edge-detection algorithm. In the example of FIG. 5*c*, the extracted data (numerals 2, 4 and 9) captured from an LCD display on the control panel, are identified and analyzed by the system. For example, optical character recognition (OCR) processes may be performed on the binary image or variation thereof. Accordingly, the information construed via the optical character recognition processes (e.g., instrument readings) can be used to inform the operator (whether human or autopilot) and to control, actuate, and/or manipulate the instruments and/or any flight controls. FIG. 5*d* illustrates an additional image of a set of instruments 120. As explained above, application of an edge-detection algorithm generates a virtual, parsable image (FIG. 5*e*), which serves as an interim step in vision system processing and analysis.

In operation, when effecting a particular operation (e.g., a maneuver), the perception system 106 may locate and monitor the associated instruments 120 as the operation is performed. For example, in a situation where the aircraft is instructed to navigate from a first higher altitude to a second lower altitude, the perception system 106 may locate the panel within the cockpit that contains the altimeter (along with any other necessary instruments), after which an image may be taken of the panel (or portion thereof containing the altimeter and other necessary instruments). The captured image may then be processed to identify and recognize the portion of the captured image containing altimeter. The information reflecting the current altitude may be recognized and determined (e.g., using OCR) from the image of the altimeter. The current altitude, as determined by the perception system 106, may be compared to a desired altitude (e.g., via the core platform 102, flight control system 116, or another processor). If the current altitude is greater than the desired altitude, the flight control system 116, for example, may instruct the aircraft to reduce altitude (by actuating the aircraft control surfaces, for example) until the current altitude matches, or falls within a predetermined deviation of the desired altitude. Once the altitude matches, or falls within a predetermined deviation of the desired altitude, the operation may be considered complete. To ensure that the current altitude (or other monitored parameter) is monitored in real time, or near real time, the perception system 106 may repeatedly capture and process images of the altimeter (or other instruments) during operation.

Advantageously, the process of reformatting the image allows for the system to recognize particular instruments regardless of relative orientation. In other words, the image can be taken from any angle and/or distance from the instruments 120; yet the controller is capable of identifying and/or manipulating imaged elements to recognize, and thus compare, the cockpit instruments with a catalogue of images of known cockpit instruments. Thus, a static camera and/or a camera that is remotely located from the robotic arm 110 would not be required, providing benefits over conventional systems.

Figure 6:
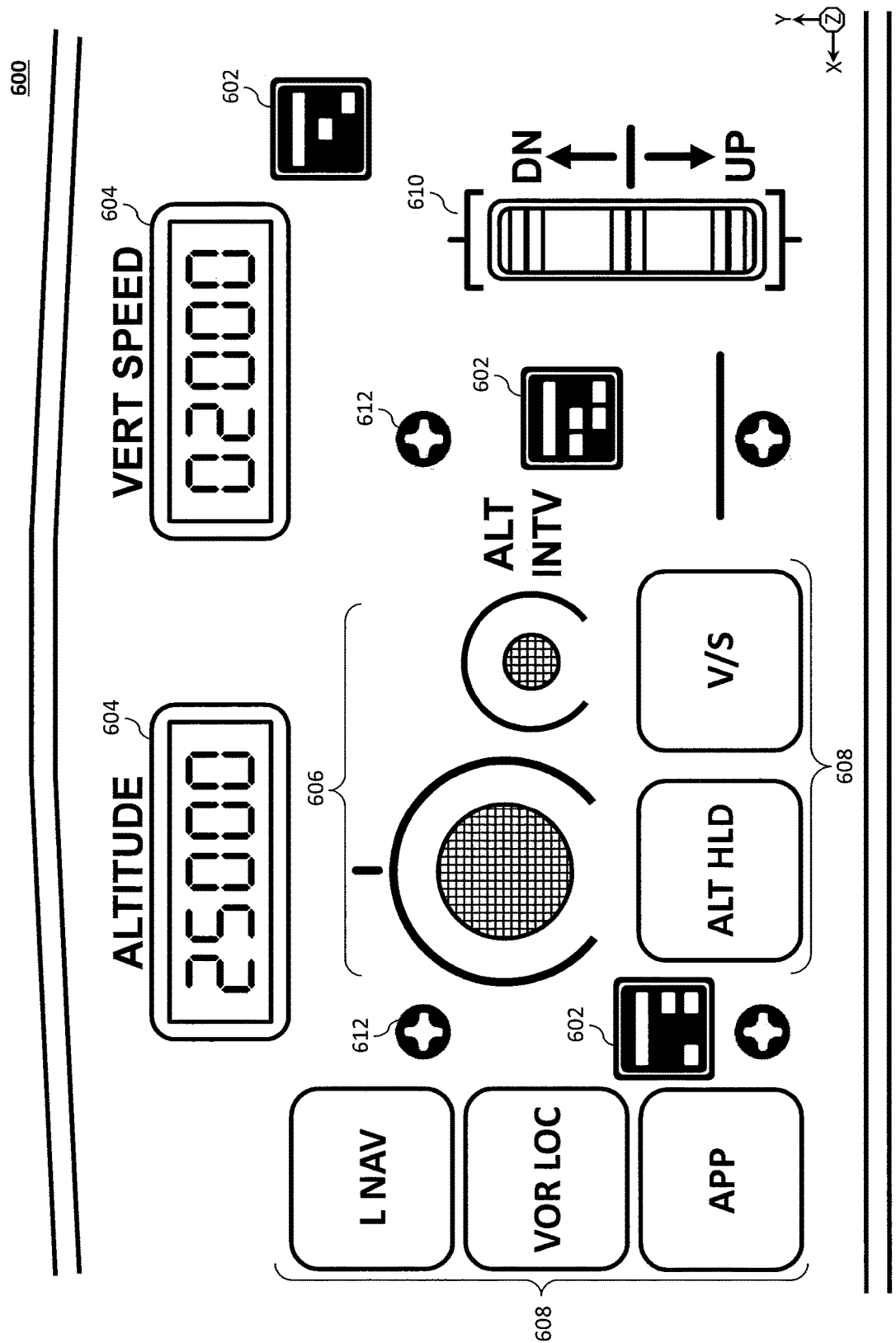
FIG. 6 illustrates a schematic representation of a raw image captured by an imaging system.

FIG. 6 shows a schematic representation 600 of an example image captured by an imaging system 118 in a Boeing 737's cockpit. In certain aspects, visual fiducial markers 602 (e.g., two-dimensional machine-readable markers) can be provided adjacent or near the instruments 120 to facilitate imaging capabilities and to enhance location determination. As illustrated, the cockpit can include various forms of instruments 120, including, inter alia, display screens 604, knobs (or dials) 606, buttons 608, and wheel selectors 610. To introduce additional complications, structural components, such as screw heads 612, may also be visible among the instruments 120. Therefore, the fiducial markers 602, each of which provides or represents a unique reference identifier (unique ID), may be positioned at known locations in the cockpit to assist the imaging system 118 in locating, monitoring, and/or selecting the appropriate instruments 120. As can be appreciated, integral to the fiducial system is software that tightly and seamlessly integrates robotic motion, force, and vision modalities to generate a more complete and useful picture of the operating environment.

The fiducial markers 602 can be used to store information that can be read and deciphered by optical cameras to provide the unique ID. The fiducial marker 602 may be, for example, a barcode, which is a machine-readable optical label that contains information about the item to which it is attached. Example barcodes include, inter alia, a single marker 700*a* (FIG. 7*a*), linear barcodes, such as universal product code (UPC) (e.g., UPC-A) barcodes 700*b* (FIG. 7*b*), and matrix (two-dimensional (2D)) barcodes, such as quick response (QR) codes 700*c* (FIG. 7*c*), AprilTags (or ARTag) 700*d* (FIG. 7*d*), and, as will be discussed, micro fiducial (µFid) markers 800.

Figure 7A:
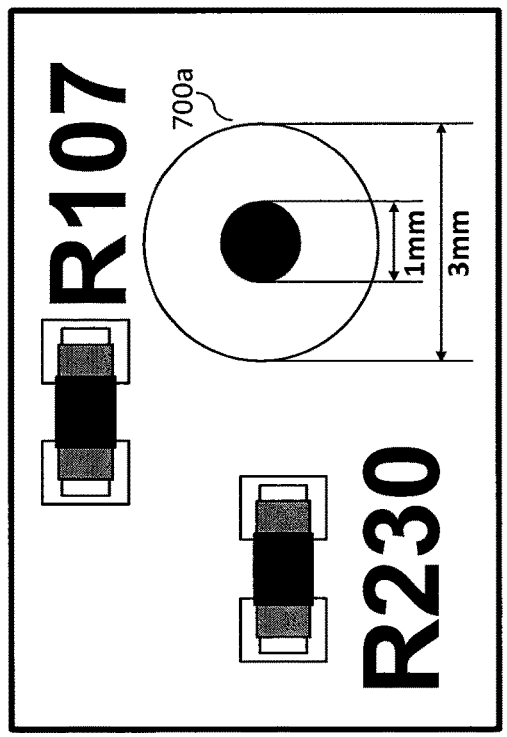
FIGS. 7a through 7d illustrate example fiducial markers.

The single marker 700*a* may be, for example, an image having one or more shapes or patterns that function as a unique ID, such as the concentric circles or rings illustrated in FIG. 7*a*. A single marker 700*a* may employ concentric rings (or circles) of different diameter. With reference to FIG. 7a, for example, a single marker 700a may be positioned on an object (illustrated as a printed circuit board (PCB)) and used to align the object relative to the camera within a coordinate system. In this example, the camera may be stationary such that the object may be aligned relative to the cameras (or nearby tooling). The single marker 700a includes a center circle with a smaller diameter (e.g., 1 mm) and an outer circle with a larger diameter (e.g., 3 mm). The size of the single marker 700a captured by the camera may be used to determine depth. The diameters may be adjusted to distinguish one single marker 700a from another single marker 700a. As can be appreciated, single markers 700a are not very robust and carry a nominal data payload.

Figure 7B:
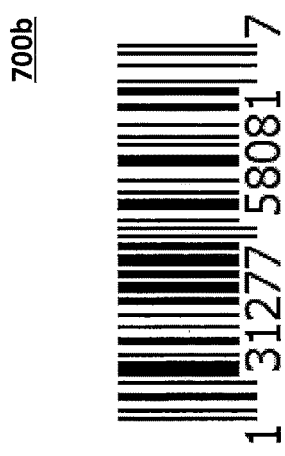
Figure 7C:
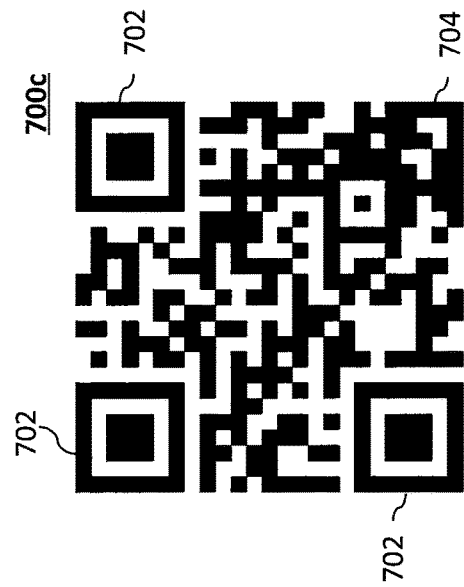
Figure 7D:
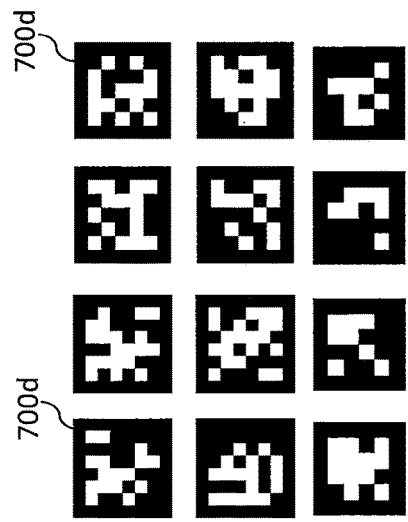

UPC barcodes 700b can be printed at various densities to accommodate a variety of printing and scanning processes. The significant dimensional parameter is called x-dimension (width of single module element). The width of each bar (space) is determined by multiplying the x-dimension and the module width (1, 2, 3, or 4 units) of each bar (space). Since the guard patterns each include two bars, and each of the 12 digits of the UPC-A barcode consists of two bars and two spaces, all UPC-A barcodes consist of exactly (3×2)+(12×2)=30 bars, of which 6 represent guard patterns and 24 represent numerical digits. For example, the UPC-A barcode of FIG. 7b represents the unique ID "131277580817."

A QR code 700c uses four standardized encoding modes (numeric, alphanumeric, byte/binary, and kanji) to efficiently store data. As illustrated, a QR code 700c generally comprises black squares arranged in a square grid on a white background. The QR code 700c can be read by the imaging system 118 or an imaging device such as a camera. The QR code 700c can be processed using Reed-Solomon error correction until the image can be appropriately interpreted. The required data is then extracted from patterns that are present in both horizontal and vertical components of the image.

A QR code 700c can be detected by a 2-dimensional digital image sensor (e.g., a camera) and then digitally analyzed by a programmed processor. The processor locates the three distinctive squares 702 at the corners of the QR code 700c image and uses a smaller square (or multiple squares) near the fourth corner 704 to normalize the image for size, orientation, and angle of viewing. The small dots throughout the QR code 700c are then converted to binary numbers and validated with an error-correcting algorithm. The amount of data that can be stored in the QR code 700c depends on the datatype, version (1 . . . 40, which indicates the overall dimensions of the symbol), and error correction level. QR codes 700c and QR code technology is described in greater detail by U.S. Pat. No. 5,726,435 to Masahiro Hara et al. and titled "Optically Readable Two-dimensional marker And Method And Apparatus Using The Same."

AprilTags 700d are conceptually similar to QR codes 700c, in that they are a type of two-dimensional bar code. AprilTags 700d, however, are designed to encode far smaller data payloads (between 4 and 12 bits), allowing them to be detected more robustly and from longer ranges than QR codes 700c. AprilTags 700d are useful for a wide variety of tasks, including augmented reality, robotics, and camera calibration. Further, AprilTags 700d are designed for high localization accuracy. That is, the precise 3D position of the AprilTag 700d can be computed with respect to the camera. AprilTag 700d markers or targets can be created from an ordinary printer, and the AprilTag 700d detection software computes the precise 3D position, orientation, and identity of the tags relative to the camera. AprilTags 700d are designed to be easily included in other applications, as well as be portable to embedded devices. Real-time performance can be achieved even on cell-phone grade processors. Generally speaking, AprilTags 700d encode less information then QR codes 700c, resulting in a smaller dimension.

In more dynamic environments, such as a cockpit, the choice of fiducial markers 602 is of heightened importance because the fiducial markers 602 must provide reliable visual references within the scene captured by the imaging system 118, which can then be used to estimate, for example, the camera position or its motion. Such framework requires that the fiducial marker system be robustly and accurately detectable even under very challenging conditions, such as, e.g., when the markers are partially or largely occluded, or seen under highly skewed angles or from long distances, when the illumination is very poor or irregular, or when the camera undergoes very fast motions generating blur.

Figure 8B:
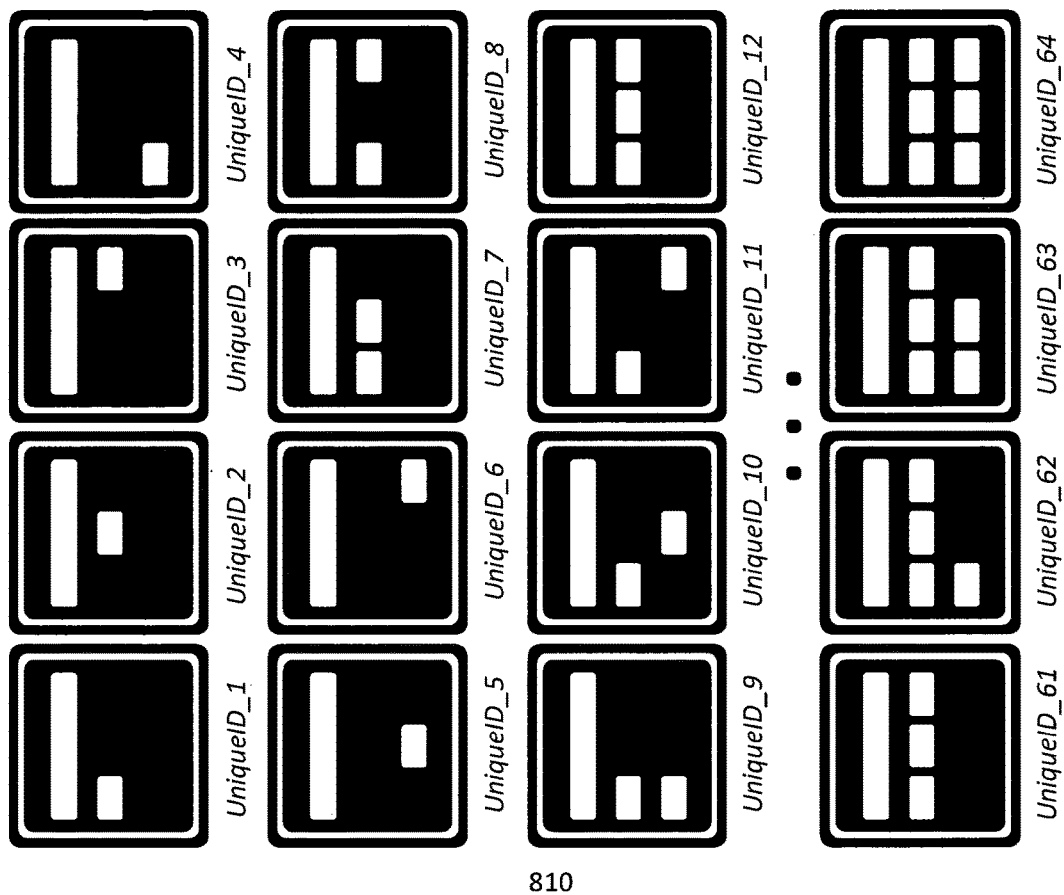
FIGS. 8a and 8b illustrate example micro fiducial (µFid) markers.
Figure 8A:
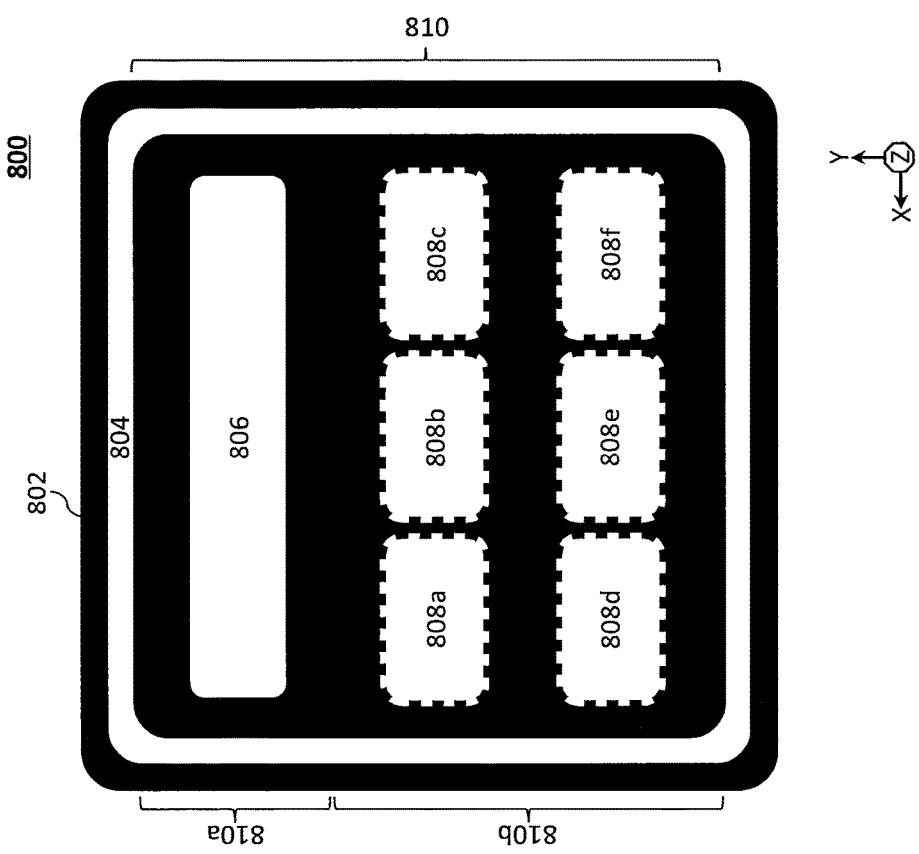

With reference to FIG. 8a, a micro fiducial (μFid) marker 800 may be used to provide robust, reliable visual references. The μFid marker 800 serves to fill an information gap between AprilTags 700d and single markers 700a. For many applications, AprilTags 700d encode more information than required, thereby resulting in a large fiducial size and unnecessary computing time. A physically large marker and increased computing time is undesirable in aircrew automation systems 100 where physical space is at a premium and fast, efficient computer processing is important. Therefore, the μFid marker 800 may be configured to encode only 6 bits of information, which reduces its physical size and computing time requirements, while being adequate for machine-vision systems in cockpits.

As illustrated, the μFid marker 800 employs a specific pattern to optically encode, for example, six bits of information that may be read and deciphered by the imaging system 118 and a camera-based machine vision algorithm. Scale, rotation, and location of other objects (e.g., instruments 120) in frame may be determined using the μFid marker 800. The three main features of the μFid pattern are the perimeter line 804, the orientation bar 806, and the bit cells 808. The μFid marker 800 may be mounted on or near a target object, such as a display screen 604 to be read, or a tool to be identified. The μFid marker 800 may be mounted or printed wherever needed for the application. For example, the μFid marker 800 may be provided on a base substrate 802 fabricated from paper, cardboard, plastic, etc. In certain aspects, the base substrate 802 may be facilitated using an electronic device. For example, an electronic display device (e.g., a separate LCD display, the cockpit display screen 604, etc.) may be configured to display the μFid marker 800, whereby the electronic display device serves as the base substrate 802 and displays the various elements thereon.

Using the schematic representation 600 of FIG. 6 as an example, three μFid markers 800 can be used as fiducial markers 602 to isolate a display screen 604 (e.g., a 7 segment LCD display, such as those used to display the altitude and vertical speed) for processing by the aircrew automation system 100. The μFid markers 800 allow a non-static (i.e., movable) camera to identify key features, such instruments (e.g., as buttons and LCD screens), as the camera 310 moves through the cockpit. The μFid markers 800 enables the machine vision algorithm to locate and determine a button/switch position (e.g., whether engaged/disengaged; on/off) and to locate and perform optical character recognition on the LCD screens. The vision capability is not sensitive to camera distance, location, or orientation if the field of view captures both the desired object and its associated μFid marker(s) 800.

The μFid marker 800 employs unique μFid patterns (e.g., unique IDs). Each unique ID may be correlated with a known physical location on a surface in the cockpit using, for example, a look up table in a database. The relationship between the known physical location(s) and the various instruments 120 may also be known and stared to the database. Using the two known locations, a processor (e.g., the perception controller 302) may be used to determine a spatial relation between a physical target object (e.g., desired instrument 120) relative to one or more physical micro-fiducial markers positioned on the external surface of the cockpit. The processor may then obtain from the camera a digital scene of the surface, which includes a digital representation of each of the physical micro-fiducial marker(s) and the various instruments 120, including the physical target object. The processor may then determine a location of the camera (or a portion of the robotic arm 110, such as the end-effector 404) relative to the location of the physical target object as a function of the digital representation of each of the plurality of said physical micro-fiducial markers in the digital scene.

The base substrate 802 of the μFid pattern can be a quadrilateral (e.g., a square as illustrated) with a perimeter line (border) 804 (e.g., a thin white line) along the around the perimeter. In other words, the perimeter line 804 runs adjacent the perimeter (along the outer edges) of the base substrate 802. The perimeter line 804 is preferably a highly contrasting color relative to the base substrate 802 (e.g., a sufficient print contrast ratio for optical character recognition reading), which allows the imaging system 118 to more accurately image the perimeter line 804. For example, as illustrated, the base substrate 802 may be black and the perimeter line 804 may be white. While the base substrate 802 is illustrated as a quadrilateral, other shapes are contemplated, such as circles, ovals, triangles, pentagons, hexagons, etc.

The portion of the base substrate 802 encompassed by the perimeter line 804 is the image region 810. The image region 810 may be generally divided into a plurality of sub-regions. In a 6-bit μFid marker 800, for example, the image region 810 may be generally divided into two or more non-overlapping sub-regions; a first (upper) sub-region 810a and a second (lower) sub-region 810b. As can be appreciated, the image region 810 is not physically divided into sub-regions, but rather, is processed by the imaging system 118 (or other processor) as a function of the shapes detected within each sub-region.

As illustrated, the upper sub-region 810a of the μFid marker 800 may include an orientation bar 806, thereby operating as an orientation sub-region. As illustrated, the orientation bar 806 may be a long quadrilateral (e.g., rectangle shape). For example, the orientation bar 806 may be an elongated quadrilateral with an aspect ratio of at least 3:1 (X, width:Y, height), or, as illustrated, 5:1. In other words, the orientation bar 806 may be an elongated quadrilateral having at least one side (i.e., the longitudinal side) that is at least three times the length of a second, perpendicular, side. The orientation bar 806 is preferably a highly contrasting color relative to the base substrate 802, which allows the imaging system 118 to more accurately image the orientation bar 806. For example, as illustrated, the base substrate 802 may be black and the orientation bar 806 may be white.

The perimeter line 804 and orientation bar 806 allow for easy spatial location and scaling of an image. More specifically, the perimeter line 804 and orientation bar 806 are used to determine the μFid marker's 800 location in space and angle relative to a camera that is communicatively coupled to the imaging system 118. Knowledge of the physical dimensions of the target object in reference to the μFid marker 800 enables the scale, location, and rotation of the target object to be determined. In other words, if the physical dimensions of the μFid marker 800 are known, the size of objects in the same image and on the same plane as the μFid marker 800 can also be determined.

The bit cells 808 are used to determine the unique ID of the μFid marker 800. Specifically, the bit cells 808 are arranged to form a two-dimensional grid arrangement readable by, for example, a camera or other optical device during an imaging or scanning operation. The bit cells 808 are the variable elements of the μFid code's 800 μFid pattern. As illustrated, each of the bit cells 808 may be a quadrilateral (e.g., rectangle or square shape), though other shapes are contemplated, such as circles, ovals, triangles, pentagons, hexagons, etc. For example, each of the bit cells 808 may be a rectangle with an aspect ratio of at least 1.5.

The bit cells 808 can be arranged in a grid formation and located in the second sub-region 810b. In other words, the second sub-region 810b serves as the data region. The bit cells 808 may be arranged into one or more bit rows. Specifically, six bit cells 808 are illustrated in the data region in a 2 (H)×3 (W) grid arrangement to provide 6-bits of data. The bit cells 808 are preferably a highly contrasting color relative to the base substrate 802, which allows the imaging system 118 to more accurately image the bit cells 808. For example, as illustrated, the base substrate 802 may be black and the bit cells 808 may be white. As illustrated, while the bit cells 808 and the orientation bar 806 are generally the same height (Y-axis), the width (X-axis) of the orientation bar 806 may be substantially the same as the width of the bit row (e.g., three bit cell 808). Therefore, for a 2×3 grid arrangement, the width of the orientation bar 806 is more than three times greater than the width of each bit cell 808 (accounting for spacing between adjacent bit cells 808).

In a monochromatic framework (e.g., black and white), the number of unique IDs=$2^x$, where x equals number of bit cells 808. In a 6-bit μFid marker 800 having two-bit rows, each bit row may contain three bit cells 808 for a total of six bit cells 808. At least one of the bit rows may be generally parallel to the longitudinal axis of the orientation bar, although each bit row is typically parallel to the orientation bar. As illustrated in FIG. 8b, employing six-bit cells 808 allow for 64 unique IDs (i.e., $2^6$=64). If 64 bits of information is not the desired amount, the size of μFid marker 800 may be changed by adding or subtracting bit cells 808, which may result in additional (or fewer) bit rows. By way of illustration, a 4-bit μFid code (i.e., $2^4$=16 unique IDs) may be achieved using four bit cells 808 in either a 2×2 grid arrangement or a 1×4 grid arrangement. In another example, a 8-bit μFid code (i.e., $2^8$=256 unique IDs) may be achieved using eight bit cells 808 in a 2×4 grid arrangement, while a 9-bit μFid code may be achieved using nine bit cells 808 in a 3×3 grid arrangement.

Increasing the size of the μFid marker 800 to accommodate additional bit cells 808, however, can reduce its size/bit loading advantages over the existing concepts. For example, the μFid marker 800 may encode less information then existing fiducial solutions and, therefore, can be smaller in size. The decreased size requires less physical space for mounting in the cockpit (or other surface/area to be imaged) as well as less time to process images. Therefore, the number of bits and the grid arrangement may be selected as a function of the desired number of bits and physical size or shape of the μFid marker 800. That is, if a long, narrow μFid marker 800 is desired, the grid arrangement may be limited to, for example, a single row grid arrangement (i.e., 1×n, where n=the number of bit cells 808) or a dual row grid arrangement (i.e., 2×n, where n=½ the number of bit cells 808). Alternatively, where possible and desired, if a µFid marker 800 and AprilTag 700d were identical in physical size, the reduced resolution of the µFid marker 800 would enable it to be read accurately from a further distance.

Figure 9C:
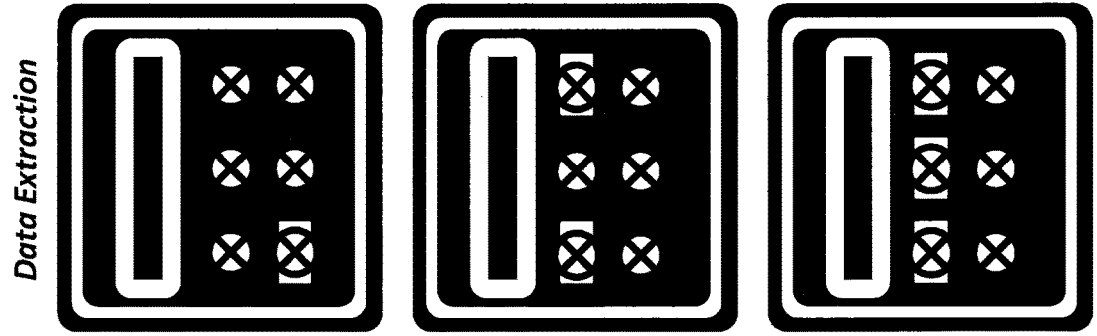
FIGS. 9a through 9c illustrate example µFid markers during various stages of image processing.
Figure 9B:
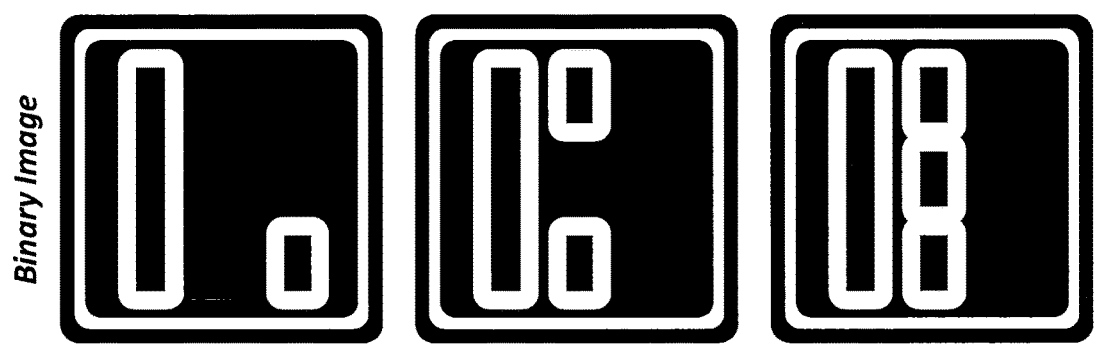
Figure 9A:
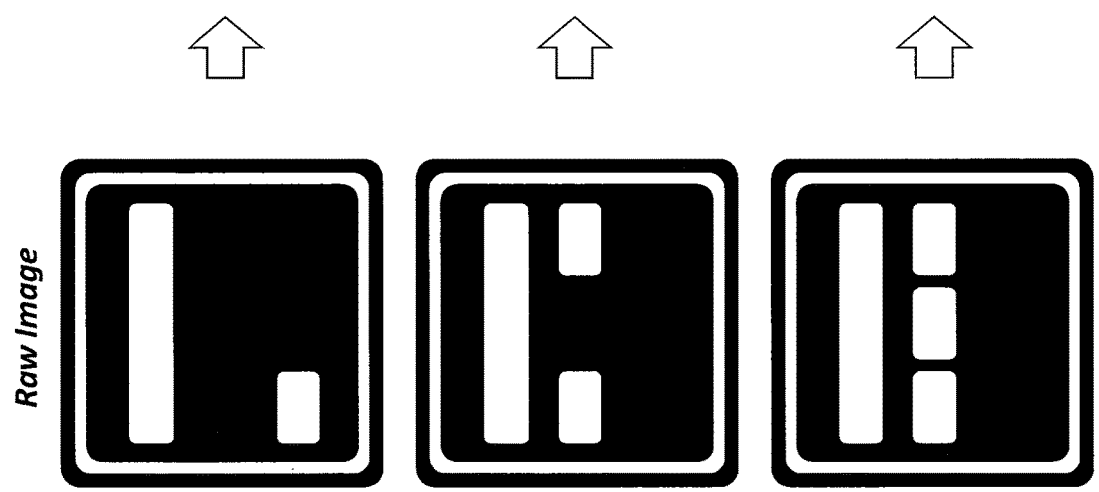

Accordingly, the µFid marker 800 may be used in a vision system installed in an aircraft cockpit, such as imaging system 118. FIG. 9a illustrates example raw images of three different µFid markers 800 as captured by a camera of the imaging system 118. The imaging system 118 may then process the raw images using, for example, an edge-detection algorithm to generate binary images having two values, such as light (e.g., white) and dark (e.g., black). The binary image can be used to identify the location of the bit cells 808 using the perimeter line 804 and the orientation bar 806, as illustrated in FIG. 9b. Once the locations of the bit cells 808 have been identified, as illustrated in FIG. 9c, the imaging system 118 performs a data extraction process to determine the unique ID based on which of the bit cells 808 are white (high—a binary "1") and which are black (low—a binary "0"). For example, the processor knows the location of each bit cell 808 as a function of the perimeter line 804 and the orientation bar 806 using information stored to memory; therefore the processor can check each location to determine whether the pixels are white or black.

While the µFid marker 800 is describe as having a base substrate 802 that is dark (black) and features (e.g., perimeter line 804, orientation bar 806, and bit cells 808) that are light (white), the inverse is possible. For example, the base substrate 802 may be light (white) while the features may be dark (black). Further, while the highly contrasting colors are generally described as black and white monochromatic framework, other colors are possible so long as the camera can distinguish the features from the base substrate 802. In certain aspects, the µFid markers 800 is not limited to a monochromatic framework, but rather, may employ a multichromatic framework having a plurality of different colors for features. In a multichromatic framework, different features can be detected using different filters. For example, the µFid marker 800 may encode independent data in two or more different colors (e.g., bit cells 808 of different colors). U.S. Pat. No. 9,111,186 to Henryk Blasinski et al. and titled "Color Barcodes for Mobile Applications: A Per Channel Framework" describes an example method and system for encoding and decoding a two-dimensional color barcode. Specifically, the Blasinski patent describes a mixed code having a first code image region to store a first code image obtained by encoding first information using color, shading, or a combination thereof, and a second code image region to store a second code image obtained by encoding second information using color, shading, or a combination thereof. In other aspects, one or more of the features may be depicted in color(s) visible only under certain light, such as ultraviolet light (electromagnetic radiation with a wavelength from 10 nm to 400 nm). Therefore, the µFid marker 800 may be a UV 2D bar code readable by a UV camera/reader.

While the µFid markers 800 are primarily described in connection with cockpit instrumentation imaging, the µFid markers 800 can be used in any application where desired visual information is in known fixed positions and needs to be quickly identified. For example, the µFid markers 800 may be used to enable built-in tests for moving robots—i.e., robot arms or unmanned ground vehicles. By way of illustration, a single robot could be commanded to a position and verify the movement by identifying multiple µFids in known locations. In co-operative robotics applications, single members of the robotic network could perform checks on other elements. All members would have unique µFid markers 800 mounted in known locations allowing the unique ID and location of each robot to be determined. Yet another use for µFid markers 800 may be with a robot capable of using multiple end effectors or tools. Each tool would be marked by a unique set of µFids. The robot would be able to identify and pick up the desired tool by locating its associated µFids. Therefore, µFid markers 800 may be used to, inter alia, accomplish machine vision in an aircraft's cockpit, applications involving swarms of aircraft, self-built-in testing for robotics, and manipulation of known objects in unknown positions.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. A system for locating a physical target object within a physical location, the system comprising:
   a camera configured to capture a digital scene of the physical location having a physical micro-fiducial marker and the physical target object, wherein the physical micro-fiducial marker comprises (1) a base substrate of a first color, (2) a perimeter line of a second color that is positioned on the base substrate and arranged to run along a perimeter of the base substrate, (3) an orientation bar of the second color, and (4) a plurality of bit cells, each of said plurality of bit cells being either the first color or the second color to represent a binary-coded datum and, arranged to form a two-dimensional grid arrangement representing a unique ID that is readable by the camera; and
   a processor operatively coupled with the camera, wherein the processor is configured to process the digital scene to determine a spatial relation between the physical target object and the physical micro-fiducial marker and to output information relating to the physical target object or the spatial relation.

2. The system of claim 1, wherein the first color is a highly contrasting color relative to the second color.

3. The system of claim 1, wherein the orientation bar is a rectangle having an aspect ratio of at least 3:1.

4. The system of claim 1, wherein the perimeter line defines an image region having a first non-overlapping sub-region and a second non-overlapping sub-region.

5. The system of claim 4, wherein the first non-overlapping sub-region comprises the orientation bar.

6. The system of claim 5, wherein the second non-overlapping sub-region comprises the plurality of bit cells.

7. The system of claim 5, wherein the second non-overlapping sub-region is a data region.

8. The system of claim 1, wherein the plurality of bit cells consists of six bit cells.

9. The system of claim 8, wherein the six bit cells are arranged in a 2×3 grid arrangement.

10. The system of claim 1, wherein the two-dimensional grid arrangement includes at least one bit row.

11. The system of claim 10, wherein the at least one bit row is parallel to a longitudinal axis of the orientation bar.

12. The system of claim 1, wherein the base substrate is a quadrilateral base substrate.

13. The system of claim 12, wherein the quadrilateral base substrate is a square.

14. A method for locating a physical target object within a physical location using a plurality of physical micro-fiducial markers and a digital scene captured by a camera, the method comprising the steps of:

determining a spatial relation between the physical target object relative to a plurality of physical micro-fiducial markers positioned on an external surface of an object, wherein each of the physical micro-fiducial markers comprises a base substrate of a first color; a perimeter line of a second color that is positioned on the base substrate and arranged to run along a perimeter of the base substrate, an orientation bar of the second color, and a plurality of bit cells, each of said plurality of bit cells being either the first color or the second color and configured to represent a binary-coded datum, and wherein the plurality of bit cells is arranged to form a two-dimensional grid arrangement representing a unique ID that is readable by a camera during an imaging operation;

obtaining the digital scene of the object including a digital representation of each of the plurality of said physical micro-fiducial markers;

performing an edge-detection algorithm on the digital scene to generate a binary image of the digital scene; and processing the binary image to extract information relating to the physical target object.

15. The method of claim 14, wherein the physical target object is a flight instrument and the information is flight information.

16. The method of claim 15, wherein the flight information is determined by performing one or more optical character recognition (OCR) processes on the binary image or a portion thereof.

17. The method of claim 15, further comprising the step of determining a spatial relation of an actuable instrument relative to the plurality of physical micro-fiducial markers.

18. The method of claim 17, further comprising the step of actuating the actuable instrument as a function of the flight information determined using the physical target object.

19. The method of claim 18, wherein the step of actuating the actuable instrument is performed using a robotic arm.

20. The method of claim 14, further comprising the step of determining a location of the camera relative to the location of the physical target object as a function of the digital representation of each of the plurality of said physical micro-fiducial markers in the digital scene.

* * * * *